US012794633B2

(12) United States Patent
Liu

(10) Patent No.: US 12,794,633 B2
(45) Date of Patent: Nov. 10, 2026

(54) METHOD FOR DETERMINING TRACKING REFERENCE SIGNAL PERIOD, COMMUNICATION APPARATUS, AND NON-TRANSITORY COMPUTER-READABLE STORAGE MEDIUM

(71) Applicant: Beijing Xiaomi Mobile Software Co., Ltd., Beijing (CN)

(72) Inventor: Yang Liu, Beijing (CN)

(73) Assignee: Beijing Xiaomi Mobile Software Co., Ltd., Beijing (CN)

( * ) Notice: Subject to any disclaimer, the term of this patent is extended or adjusted under 35 U.S.C. 154(b) by 221 days.

(21) Appl. No.: 18/690,912

(22) PCT Filed: Sep. 9, 2021

(86) PCT No.: PCT/CN2021/117540
§ 371 (c)(1),
(2) Date: Mar. 11, 2024

(87) PCT Pub. No.: WO2023/035202
PCT Pub. Date: Mar. 16, 2023

(65) Prior Publication Data
US 2024/0405942 A1 Dec. 5, 2024

(51) Int. Cl.
*H04L 5/00* (2006.01)
*H04B 7/06* (2006.01)
*H04W 72/231* (2023.01)

(52) U.S. Cl.
CPC ......... *H04L 5/0051* (2013.01); *H04B 7/0626* (2013.01); *H04W 72/231* (2023.01)

(58) Field of Classification Search
CPC ....... H04L 5/0051; H04L 5/00; H04L 5/0048; H04L 5/0094; H04L 5/0053; H04W 72/231
See application file for complete search history.

(56) References Cited

U.S. PATENT DOCUMENTS

2019/0215117 A1 7/2019 Lee et al.

FOREIGN PATENT DOCUMENTS

| | | | | |
|---|---|---|---|---|
| CA | 3024596 A1 * | 5/2019 | ............. H04B 7/063 |
| CN | 103391622 A | 11/2013 | |
| CN | 110149178 A | 8/2019 | |
| CN | 110447268 A | 11/2019 | |
| CN | 110474745 A | 11/2019 | |
| CN | 111279648 A | 6/2020 | |
| CN | 111903085 A | 11/2020 | |

(Continued)

OTHER PUBLICATIONS

Nortel, "Location Continuity Solution for VCC for IMS Emergency", 3GPP TSG SA WG2, Meeting #70, TD S2-090277, Jan. 12-16, 2009, pp. 1-4.

(Continued)

*Primary Examiner* — Jamal Javaid
(74) *Attorney, Agent, or Firm* — Oblon, McClelland, Maier & Neustadt, L.L.P.

(57) ABSTRACT

A method for determining a tracking reference signal period, performed by a network device, and including: sending, on a physical layer, first indication information to a terminal device, wherein the first indication information is used to indicate a change period of a tracking reference signal (TRS).

15 Claims, 3 Drawing Sheets

(56) References Cited

FOREIGN PATENT DOCUMENTS

| | | | | | |
|---|---|---|---|---|---|
| CN | 112583563 | A | | 3/2021 | |
| CN | 113347713 | A | | 9/2021 | |
| EP | 3337199 | A1 | * | 6/2018 | .............. H04W 4/06 |
| WO | WO-2019051242 | A2 | * | 3/2019 | ............ H04W 72/23 |
| WO | WO 2020/253612 | A1 | | 12/2020 | |
| WO | WO 2021/067808 | A1 | | 4/2021 | |
| WO | WO 2021/155789 | A1 | | 8/2021 | |
| WO | WO 2021/163900 | A1 | | 8/2021 | |

OTHER PUBLICATIONS

International Search Report issued Apr. 26, 2022 in PCT/CN2021/117540, filed on Sep. 9, 2021, 4 pages (with English Translation).

Chinese Office action issued Jan. 12, 2024 in CN 202180002829.3, 14 pages (with English translation).

* cited by examiner

METHOD FOR DETERMINING TRACKING REFERENCE SIGNAL PERIOD, COMMUNICATION APPARATUS, AND NON-TRANSITORY COMPUTER-READABLE STORAGE MEDIUM

CROSS REFERENCE TO RELATED APPLICATIONS

The present application is a U.S. National Phase of International Application No. PCT/CN2021/117540, filed on Sep. 9, 2021, the contents of all of which are incorporated herein by reference in their entireties for all purposes.

BACKGROUND

Technical Field

The present disclosure relates to the field of communication technology, and in particular, to a method and apparatus for determining a tracking reference signal period.

Description of the Related Art

In a communication system, when receiving downlink data transmission, a terminal device needs to continuously track and compensate a time offset and a frequency offset according to a measured tracking reference signal (TRS), so as to ensure accuracy of downlink data reception. In the related art, a TRS period generally includes 5 milliseconds (ms), 10 ms, 20 ms, 40 ms, and 80 ms.

SUMMARY

In a first aspect, according to some embodiments of the present disclosure, there is provided a method for determining a tracking reference signal period, where the method is performed by a network device, and the method includes sending, on a physical layer, first indication information to a terminal device, where the first indication information is used to indicate a change period of a tracking reference signal (TRS).

In a second aspect, according to some embodiments of the present disclosure, there is provided another method for determining a tracking reference signal period, where the method is performed by a terminal device, and the method includes receiving, on a physical layer, first indication information sent by a network device, where the first indication information is used to indicate a change period of a tracking reference signal (TRS).

In a third aspect, according to some embodiments of the present disclosure, there is provided a communication apparatus, where the communication apparatus includes a processor and a memory, and the memory stores a computer program; and when the computer program is executed by the processor, the communication apparatus is enabled to perform the method according to the first aspect.

BRIEF DESCRIPTION OF THE DRAWINGS

In order to more clearly illustrate the technical solutions in the embodiments of the present disclosure or the background, the accompanying drawings required in the embodiments or the background of the present disclosure are described below.

DETAILED DESCRIPTION OF THE PREFERRED EMBODIMENTS

In order to better understand the method for determining a tracking reference signal period disclosed in the embodiments of the present disclosure, a communication system to which the embodiments of the present disclosure are applicable, is firstly described below.

Figure 1:
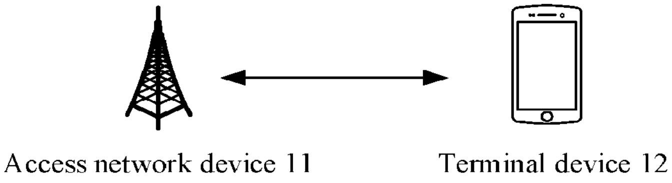
FIG. 1 is a schematic diagram of an architecture of a communication system according to some embodiments of the present disclosure.

FIG. 1 is a schematic diagram of an architecture of a communication system according to some embodiments of the present disclosure. The communication system may include, but is not limited to, a network device and a terminal device. The number and the form of the devices shown in FIG. 1 are only used for example and do not constitute a limitation on the embodiments of the present disclosure. In actual application, it may include two or more network devices, and two or more terminal devices. In the communication system shown in FIG. 1, it is taken that one network device 11 and one terminal device 12 are included as an example.

It should be noted that the technical solutions of the embodiments of the present disclosure may be applied to various communication systems, such as a long term evolution (LTE) system, a 5th generation (5G) mobile communication system, a 5G new radio (NR) system, or another future new mobile communication system.

The network device 11 in the embodiments of the present disclosure is an entity on a network side for transmitting or receiving a signal. For example, the network device 11 may be an evolved NodeB (eNB), a transmission reception point (TRP), a next generation NodeB (gNB) in an NR system, a base station in another future mobile communication system or an access node in a WiFi system, or the like. Specific technologies and specific device forms used by the network device are not limited in the embodiments of the present disclosure. The network device provided in the embodiments of the present disclosure may be composed of a central unit (CU) and a distributed unit (DU), where the CU may also be referred to as a control unit. By using a CU-DU structure, the protocol layers of the network device, such as a base station, may be split; functions of a part of the protocol layers are controlled in the CU, and functions of the remaining part or all of the protocol layers are distributed in the DU, and the DU is centrally controlled by the CU.

The terminal device 12 in the embodiments of the present disclosure is an entity, such as a mobile phone, on a user side for receiving or transmitting a signal. The terminal device may also be referred to as a terminal, user equipment (UE), a mobile station (MS), a mobile terminal device (MT), or the like. The terminal device may be a vehicle having a communication function, a smart vehicle, a mobile phone, a wearable device, a tablet computer (PAD), a computer with a wireless transceiving function, a virtual reality (VR) terminal device, an augmented reality (AR) terminal device, a wireless terminal device in industrial control, a wireless terminal device in self-driving, a wireless terminal device in a remote medical surgery, a wireless terminal device in a smart grid, a wireless terminal device in transportation security, a wireless terminal device in a smart city, a wireless terminal device in smart home, or the like. Specific technologies and specific device forms used by the terminal device are not limited in the embodiments of the present disclosure.

It may be understood that the communication system described in the embodiments of the present disclosure is intended to describe the technical solutions of the embodiments of the present disclosure more clearly, and does not constitute a limitation on the technical solutions provided in the embodiments of the present disclosure. Those of ordinary skill in the art may know that, with the evolution of the system architecture and the occurrence of a new service scene, the technical solutions provided in the embodiments of the present disclosure are also applicable to similar technical problems.

For a TRS with a short period, if the TRS period is changed by changing the configuration period of the network device for the channel state information (CSI) reference signal (RS), not only the load of the network signaling is affected, but also the power consumption of the network device is increased.

The method and apparatus for determining a tracking reference signal period provided in the present disclosure are described in detail below with reference to the accompanying drawings.

Figure 2:
FIG. 2 is a schematic flowchart of a method for determining a tracking reference signal period according to some embodiments of the present disclosure.

Referring to FIG. 2, FIG. 2 is a schematic flowchart of a method for determining a tracking reference signal period according to some embodiments of the present disclosure, and the method is performed by a network device. As shown in FIG. 2, the method may include, but is not limited to, the following steps.

In step 21, first indication information is sent, on a physical layer, to a terminal device, where the first indication information is used to indicate a change period of a tracking reference signal (TRS).

In the present disclosure, considering that the period for performing CSI RS configuration by using the radio resource control (RRC) message is longer that a short TRS period, in order to avoid increasing of the signaling load due to indicating the change period of the TRS to the terminal device by changing the configuration period of the RRS message, the change period of the TRS is indicated to the terminal device by using the physical layer signaling.

In some embodiments, the network device may add the first indication information in an available indication of the TRS of the physical layer, so as to indicate the change period of the TRS.

Alternatively, the network device may also add the first indication information to downlink control information (DCI) of the physical layer, so as to indicate the change period of the TRS.

It can be understood that in the present disclosure, the TRS period can be updated by only adding the first indication information for indicating the change period of the TRS in the signaling of the physical layer, without changing the configuration period of the RRS message of the high layer, thus reducing the power consumption of the network device.

By implementing the embodiments of the present disclosure, the network device indicates the change period of the tracking reference signal (TRS) to the terminal device on the physical layer. Therefore, the process of updating the TRS period does not affect the network signaling, and reduces the impact of updating the TRS period on the power consumption of the network device.

Figure 3:
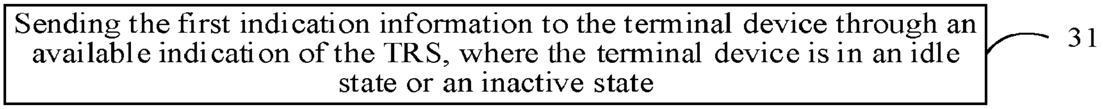
FIG. 3 is a schematic flowchart of a method for determining a tracking reference signal period according to some embodiments of the present disclosure.

Referring to FIG. 3, FIG. 3 is a schematic flowchart of a method for determining a tracking reference signal period according to some embodiments of the present disclosure, and the method is performed by a network device. As shown in FIG. 3, the method may include, but is not limited to, the following steps.

In step 31, first indication information is sent to a terminal device through an available indication of the TRS, where the terminal device is in an idle state or an inactive state.

Among them, the first indication information is used to indicate a change period of the tracking reference signal (TRS).

In some embodiments, the change period of the TRS indicated by the first indication information may be a specific period size after the TRS changes, for example, 10 ms, 20 ms, or the like, which is not limited in the present disclosure.

Alternatively, the change period of the TRS indicated by the first indication information may also be corresponding position information of the period after the TRS changes in a preset parameter pair, and then the terminal device may determine the change period of the TRS from the preset parameter pair according to the position information.

It may be understood that the network device sends the first indication information to the terminal device through the available indication of the TRS of the physical layer to indicate the change period of the TRS, and the TRS period is updated without changing the configuration period of the RRS message of the high layer, thus reducing the power consumption of the network device.

By implementing the embodiments of the present disclosure, when the terminal device is in an idle state or an inactive state, the network device indicates the change period of the tracking reference signal (TRS) to the terminal device through the available indication of the TRS. Therefore, the process of updating the TRS period does not affect the network signaling, and reduces the impact of updating the TRS period on the power consumption of the network device.

Figure 4:
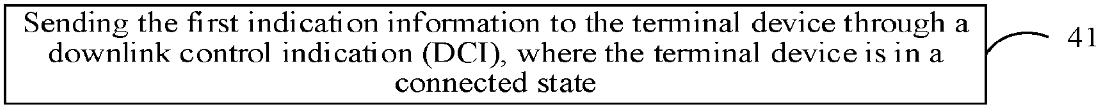
FIG. 4 is a schematic flowchart of a method for determining a tracking reference signal period according to some embodiments of the present disclosure.

Referring to FIG. 4, FIG. 4 is a schematic flowchart of a method for determining a tracking reference signal period according to some embodiments of the present disclosure, and the method is performed by a network device. As shown in FIG. 4, the method may include, but is not limited to, the following steps.

In step 41, first indication information is sent to a terminal device through a downlink control indication (DCI), where the terminal device is in a connected state.

Among them, the first indication information is used to indicate a change period of the tracking reference signal (TRS).

In some embodiments, the change period of the TRS indicated by the first indication information may be a specific period size after the TRS changes, for example, 10 ms, 20 ms, or the like, which is not limited in the present disclosure.

Alternatively, the change period of the TRS indicated by the first indication information may also be corresponding position information of the change period of the TRS in a preset parameter pair, and then the terminal device may determine the change period of the TRS from the preset parameter pair according to the position information.

It may be understood that the network device sends the first indication information to the terminal device through the DCI of the physical layer to indicate the change period of the TRS, and the TRS period is updated without changing the configuration period of the RRS message of the high layer, thus reducing the power consumption of the network device.

By implementing the embodiments of the present disclosure, when the terminal device is in a connected state, the network device indicates the change period of the tracking reference signal (TRS) to the terminal device through the downlink control indication (DCI). Therefore, the process of updating the TRS period does not affect the network signaling, and reduces the impact of updating the TRS period on the power consumption of the network device.

Figure 5:
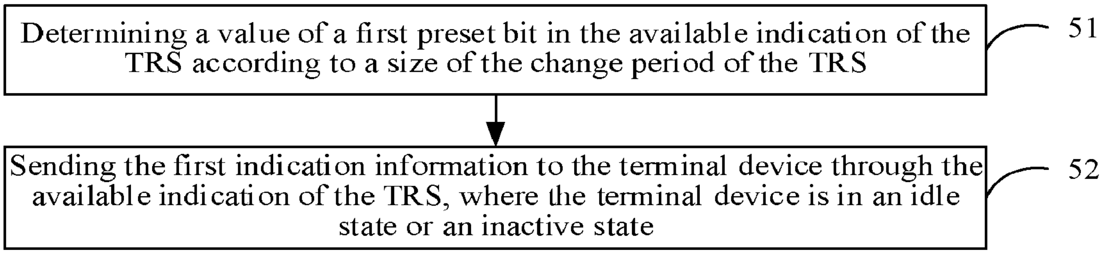
FIG. 5 is a schematic flowchart of a method for determining a tracking reference signal period according to some embodiments of the present disclosure.

FIG. 5 is a schematic flowchart of a method for determining a tracking reference signal period according to some embodiments of the present disclosure, and the method is performed by a network device. As shown in FIG. 5, the method may include, but is not limited to, the following steps.

In step 51, a value of a first preset bit in the available indication of the TRS is determined according to a size of the change period of the TRS.

Among them, the value of the first preset bit is used to represent the size of the TRS period after change.

Among them, a length n of the first preset bit may be determined according to a quantity of available periods of the TRS, which is not limited in the present disclosure.

In some embodiments, the network device may determine the length n of the first preset bit and the position of the first preset bit in the available indication of the TRS according to a protocol agreement.

In some embodiments, the network device may determine the value of the first preset bit in the available indication of the TRS according to the size of the change period of the TRS in a binary coding manner.

For example, if the size of the change period of the TRS is 5 ms, the corresponding value of the first preset bit may be 101; and if the size of the change period of the TRS is 10 ms, the corresponding value of the first preset bit may be 10010, etc., which is not limited in the present disclosure.

In step 52, first indication information is sent to a terminal device through an available indication of the TRS, where the terminal device is in an idle state or an inactive state.

Among them, the first indication information is used to indicate a change period of the tracking reference signal (TRS).

It may be understood that the first indication information in the embodiment may be the value of the first preset bit.

Among them, for the specific implementation of step 52, reference may be made to the detailed description in other embodiments of the present disclosure, and details are not described here again.

It may be understood that the network device indicates the change period of the TRS to the terminal device through the value of the first preset bit in the available indication of the TRS of the physical layer, and the TRS period is updated without changing the configuration period of the RRS message of the high layer, thus reducing the power consumption of the network device.

By implementing the embodiments of the present disclosure, the network device determines the value of the first preset bit in the available indication of the TRS according to the size of the change period of the TRS; and then, in a case that the terminal device is in an idle state or an inactive state, the network device indicates the change period of the TRS to the terminal device through the available indication of the TRS indication. Therefore, the process of updating the TRS period does not affect the network signaling, and the impact of updating the TRS period on the power consumption of the network device is reduced.

Figure 6:
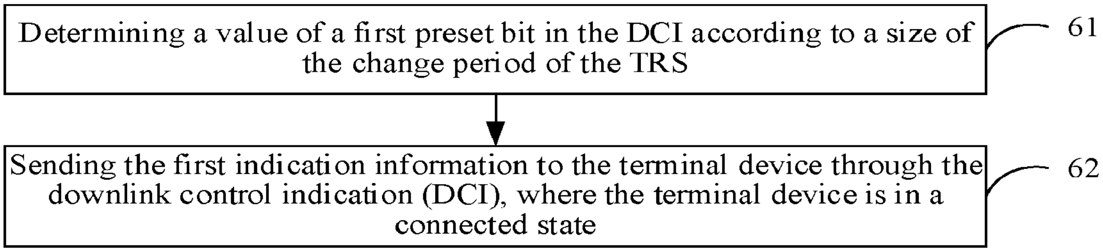
FIG. 6 is a schematic flowchart of a method for determining a tracking reference signal period according to some embodiments of the present disclosure.

Referring to FIG. 6, FIG. 6 is a schematic flowchart of a method for determining a tracking reference signal period according to some embodiments of the present disclosure, and the method is performed by a network device. As shown in FIG. 6, the method may include, but is not limited to, the following steps.

In step 61, a value of a first preset bit in the DCI is determined according to a size of the change period of the TRS.

Among them, the value of the first preset bit is used to represent the size of the TRS period size after change.

Among them, a length n of the first preset bit may be determined according to a quantity of available periods of the TRS, which is not limited in the present disclosure.

In some embodiments, the network device may determine the length of the first preset bit and the position of the first preset bit in the available indication of the TRS according to a protocol agreement.

In some embodiments, the network device may determine the value of the first preset bit in the DCI according to the size of the change period of the TRS in a binary coding manner.

For example, if the size of the change period of the TRS is 5 ms, the corresponding value of the first preset bit may be 101; and if the size of the change period of the TRS is 10 ms, the corresponding value of the first preset bit may be 10010, etc., which is not limited in the present disclosure.

In step 62, first indication information is sent to a terminal device through a downlink control indication (DCI), where the terminal device is in a connected state.

Among them, the first indication information is used to indicate a change period of the tracking reference signal (TRS).

It may be understood that the first indication information in this embodiment may be the value of the first preset bit.

It may be understood that the network device indicates the change period of the TRS to the terminal device by using the value of the first preset bit in the DCI of the physical layer, and the TRS period is updated without changing the configuration period of the RRS message of the high layer, thus reducing the power consumption of the network device.

Among them, for a specific implementation of step 62, reference may be made to the detailed description in other embodiments of the present disclosure, and details are not described here again.

By implementing the embodiments of the present disclosure, the network device determines the value of the first preset bit in the DCI according to the size of the change period of the TRS; and then, in a case that the terminal device is in the connected state, the network device indicates the change period of the TRS to the terminal device through the downlink control indication (DCI). Therefore, the process of updating the TRS period does not affect the network signaling, and the impact of updating the TRS period on the power consumption of the network device is reduced.

Figure 7:
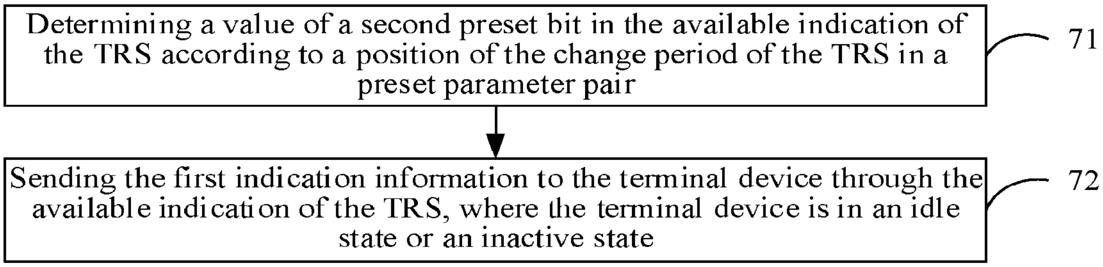
FIG. 7 is a schematic flowchart of a method for determining a tracking reference signal period according to some embodiments of the present disclosure.

Referring to FIG. 7, FIG. 7 is a schematic flowchart of a method for determining a tracking reference signal period according to some embodiments of the present disclosure, and the method is performed by a network device. As shown in FIG. 7, the method may include, but is not limited to, the following steps.

In step 71, a value of a second preset bit in the available indication of the TRS is determined according to a position of the change period of the TRS in a preset parameter pair.

Among them, the preset parameter pair may include two TRS periods of different sizes.

In some embodiments, the preset parameter pair may be configured by higher layer signaling, and include a set of a normally configured TRS period and a power saving TRS period. For example, the preset parameter pair may be [5 ms, 20 ms], where 5 ms may be a normally configured TRS period, and 20 ms may be a power saving TRS period. This is not limited in the present disclosure.

Among them, the second preset bit in the available indication of the TRS may be an information domain of nbit in the available indication of the TRS. For example, the nbit may be 1 bit, 2 bits, or the like.

For example, if the second preset bit is 1 bit, the value of the second preset bit in the available indication of the TRS being 0 may indicate that the change period of the TRS is the period value corresponding to the first position in the preset parameter pair, and the value of the second preset bit being 1 may indicate that the change period of the TRS is the period value corresponding to the second position in the preset parameter pair. Alternatively, the value of the second preset bit being 1 may indicate that the change period of the TRS is the period value corresponding to the first position in the preset parameter pair, and the value of the second preset bit being 0 may indicate that the change period of the TRS is the period value corresponding to the second position in the preset parameter pair. This is not limited in the present disclosure.

If the second preset bit is 2 bits, the value of the second preset bit being 00 may indicate that the change period of the TRS is the period value corresponding to the first position in the preset parameter pair, and the value of the second preset bit being 01 may indicate that the change period of the TRS is the period value corresponding to the second position in the preset parameter pair; the value of the second preset bit being 10 may indicate that the change period of the TRS is the period value corresponding to the third position in the preset parameter pair, and the value of the second preset bit being 11 may indicate that the change period of the TRS is the period value corresponding to the fourth position in the preset parameter pair, etc., which is not limited in the present disclosure.

In some embodiments, the network device may determine a length n of the second preset bit and a position of the second preset bit in the available indication of the TRS according to a protocol agreement.

In step 72, first indication information is sent to the terminal device through an available indication of the TRS, where the terminal device is in an idle state or an inactive state.

Among them, the first indication information is used to indicate a change period of the tracking reference signal (TRS).

It may be understood that the first indication information in this embodiment may be a value of the second preset bit in the available indication of the TRS, and the terminal device may obtain the change period of the TRS from the preset parameter pair according to the value of the second preset bit.

For a specific implementation of step 72, reference may be made to the detailed description in other embodiments of the present disclosure, and details are not described here again.

By implementing the embodiment of the present disclosure, the network device determines the value of the second preset bit in the available indication of the TRS according to the position of the change period of the TRS in the preset parameter pair; and then, in a case that the terminal device is in an idle state or an inactive state, the network device indicates the change period of the TRS to the terminal device through the available indication of the TRS. Therefore, the process of updating the TRS period does not affect the network signaling, and the impact of updating the TRS period on the power consumption of the network device is reduced.

Figure 8:
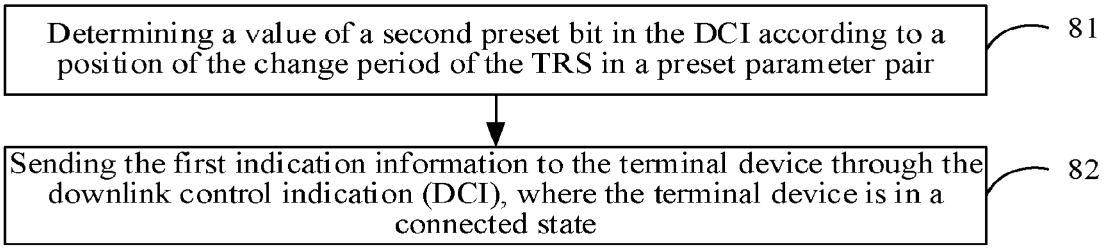
FIG. 8 is a schematic flowchart of a method for determining a tracking reference signal period according to some embodiments of the present disclosure.

Referring to FIG. 8, FIG. 8 is a schematic flowchart of a method for determining a tracking reference signal period according to some embodiments of the present disclosure, and the method is performed by a network device. As shown in FIG. 8, the method may include, but is not limited to, the following steps.

In step 81, a value of a second preset bit in the DCI is determined according to a position of the change period of the TRS in a preset parameter pair.

Among them, the preset parameter pair may include two TRS periods of different sizes.

In some embodiments, the preset parameter pair may be configured by higher layer signaling, and include a set of a normally configured TRS period and a power saving TRS period. For example, the preset parameter pair may be [5 ms, 20 ms], where 5 ms may be a normally configured TRS period, and 20 ms may be a power saving TRS period. This is not limited in the present disclosure.

In some embodiments, the second preset bit may be an information domain of a nbit in the DCI. For example, the nbit may be 1 bit, 2 bits, or the like.

For example, if the second preset bit is 1 bit, the value of the second preset bit in the DCI being 0 indicate that the change period of the TRS is the period value corresponding to the first position in the preset parameter pair, and the value of the second preset bit being 1 may indicate that the change period of the TRS is the period value corresponding to the second position in the preset parameter pair. Alternatively, the value of the second preset bit being 1 may indicate that the change period of the TRS is the period value corresponding to the first position in the preset parameter pair, and the value of the second preset bit being 0 may indicate that the change period of the TRS is the period value corresponding to the second position in the preset parameter pair. This is not limited in the present disclosure.

If the second preset bit is 2 bits, the value of the second preset bit being 00 may indicate that the change period of the TRS is the period value corresponding to the first position in the preset parameter pair, and the value of the second preset bit being 01 may indicate that the change period of the TRS is the period value corresponding to the second position in the preset parameter pair; the value of the second preset bit being 10 may indicate that the change period of the TRS is the period value corresponding to the third position in the preset parameter pair, and the value of the second preset bit being 11 may indicate that the change period of the TRS is the period value corresponding to the fourth position in the preset parameter pair, etc., which is not limited in the present disclosure.

In some embodiments, the network device may determine a length n of the second preset bit and a position of the second preset bit in the DCI according to a protocol agreement.

In step 82, first indication information is sent to the terminal device through a downlink control indication (DCI), where the terminal device is in a connected state.

Among them, the first indication information is used to indicate a change period of the tracking reference signal (TRS).

It may be understood that the first indication information in this embodiment may be a value of a second preset bit in the DCI, and the terminal device may obtain the change period of the TRS from the preset parameter pair according to the value of the second preset bit.

For a specific implementation of step 82, reference may be made to the detailed description in other embodiments of the present disclosure, and details are not described here again.

In some embodiments, in order to enable the terminal device to determine the change period of the TRS according to the value of the second preset bit, the network device may send the second indication information to the terminal device, where the second indication information is used to indicate the preset parameter pair.

By implementing the embodiment of the present disclosure, the network device determines the value of the second preset bit in the DCI according to the position of the change period of the TRS in the preset parameter pair; and then, in a case that the terminal device is in the connected state, the network device indicates the change period of the TRS to the terminal device through the downlink control indication (DCI). Therefore, the process of updating the TRS period does not affect the network signaling, and the impact of updating the TRS period on the power consumption of the network device is reduced.

Figure 9:
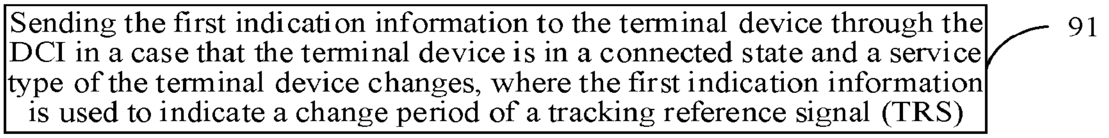
FIG. 9 is a schematic flowchart of a method for determining a tracking reference signal period according to some embodiments of the present disclosure.

Referring to FIG. 9, FIG. 9 is a schematic flowchart of a method for determining a tracking reference signal period according to some embodiments of the present disclosure, and the method is performed by a network device. As shown in FIG. 9, the method may include, but is not limited to, the following steps.

In step 91, in a case that the terminal device is in a connected state, and a service type of a terminal device changes, first indication information is sent to the terminal device through DCI.

Among them, the first indication information is used to indicate a change period of the tracking reference signal (TRS).

Among them, the service type may be classified into a high-reliability service, a normal service, a low-reliability service according to a reliability degree of the service, which is not limited in the present disclosure.

In some embodiments, the network device may configure a relatively short TRS period for a high-reliability service, and configure a relatively short TRS period for a normal service or a low-reliability service, which is not limited in the present disclosure.

It may be understood that, in a case that the service type of the terminal device changes, the network device may configure the change period of the TRS for the terminal device according to the service type after change, and send the change period of the TRS to the terminal device through the DCI, thus further reducing the power consumption of the network device.

By implementing the embodiments of the present disclosure, in a case that the terminal device is in the connected state and the service type of the terminal device changes, the network device sends the first indication information to the terminal device through the DCI. Therefore, the process of updating the TRS period does not affect the network signaling, and the impact of updating the TRS period on the power consumption of the network device is further reduced.

Figure 10:
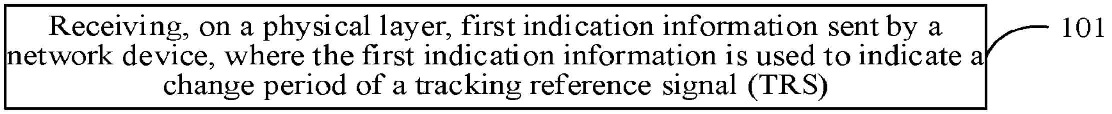
FIG. 10 is a schematic flowchart of a method for determining a tracking reference signal period according to some embodiments of the present disclosure.

Referring to FIG. 10, FIG. 10 is a schematic flowchart of a method for determining a tracking reference signal period according to some embodiments of the present disclosure, and the method is performed by a terminal device. As shown in FIG. 10, the method may include, but is not limited to, the following steps.

In step 101, first indication information sent by a network device is received on a physical layer, where the first indication information is used to indicate a change period of a tracking reference signal (TRS).

In the present disclosure, considering that the period for performing CSI RS configuration by using the radio resource control (RRC) message is longer that a short TRS period, in order to avoid increasing of the signaling load due to indicating the change period of the TRS to the terminal device by changing the configuration period of the RRS message, the change period of the TRS is indicated to the terminal device by using the physical layer signaling.

In some embodiments, the terminal device may receive, on the physical layer, the first indication information added by a network device in an available indication of the TRS, so as to determine the change period of the TRS.

Alternatively, the terminal device may further receive, on the physical layer, the first indication information added by the network device in DCI, so as to determine the change period of the TRS.

It can be understood that in the present disclosure, the TRS period can be updated by only adding the first indication information for indicating the change period of the TRS in the signaling of the physical layer, without changing the configuration period of the RRS message of the high layer, thus reducing the power consumption of the network device.

By implementing the embodiments of the present disclosure, the terminal device receives, on the physical layer, the first indication information sent by the network device, where the first indication information is used to indicate the change period of the tracking reference signal (TRS). Therefore, the process of updating the TRS period does not affect the network signaling, and the impact of updating the TRS period on the power consumption of the network device is reduced.

Figure 11:
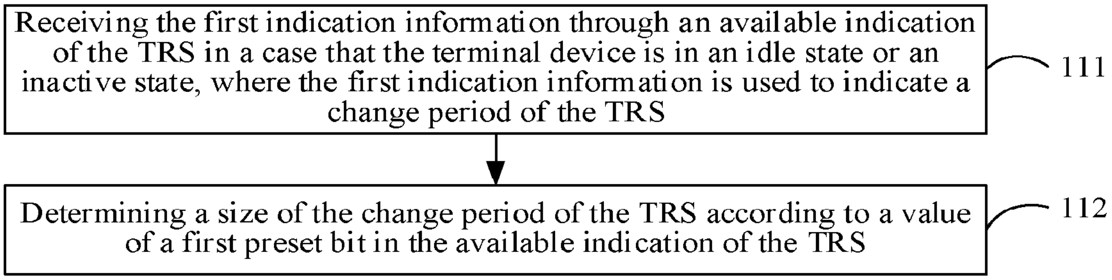
FIG. 11 is a schematic flowchart of a method for determining a tracking reference signal period according to some embodiments of the present disclosure.

Referring to FIG. 11, FIG. 11 is a schematic flowchart of a method for determining a tracking reference signal period according to some embodiments of the present disclosure, and the method is performed by a terminal device. As shown in FIG. 11, the method may include, but is not limited to, the following steps.

In step 111, in a case that the terminal device is in an idle state or an inactive state, first indication information is received through an available indication of the TRS.

Among them, the first indication information is used to indicate a change period of the tracking reference signal (TRS).

In some embodiments, the change period of the TRS indicated by the first indication information included in the available indication of the TRS may be a specific period size after the TRS changes, for example, 10 ms, 20 ms, or the like, which is not limited in the present disclosure.

In step 112, a size of the change period of the TRS is determined according to a value of a first preset bit in the available indication of the TRS.

Among them, the value of the first preset bit is used to represent the size of the TRS period after change.

For example, if the value of the first preset bit in the available indication of the TRS is 101, the corresponding size of the change period of the TRS may be 5 ms; or, the value of the first preset bit in the available indication of the TRS may be 10010, and the corresponding size of the change period of the TRS may be 10 ms.

It should be noted that the foregoing examples are merely schematic descriptions, and should not serve as a specific limitation of the value of the first preset bit and the change period of the TRS in the present disclosure.

In some embodiments, the terminal device may determine the length n of the first preset bit and the position of the first preset bit in the available indication of the TRS according to a protocol agreement or an indication of the network device, which is not limited in the present disclosure.

By implementing the embodiments of the present disclosure, in a case that the terminal device is in an idle state or an inactive state, the first indication information is received through the available indication of the TRS; and then, the size of the change period of the TRS is determined according to the value of the first preset bit in the available indication of the TRS. Therefore, the process of updating the TRS period does not affect the network signaling, and the impact of updating the TRS period on the power consumption of the network device is reduced.

Figure 12:
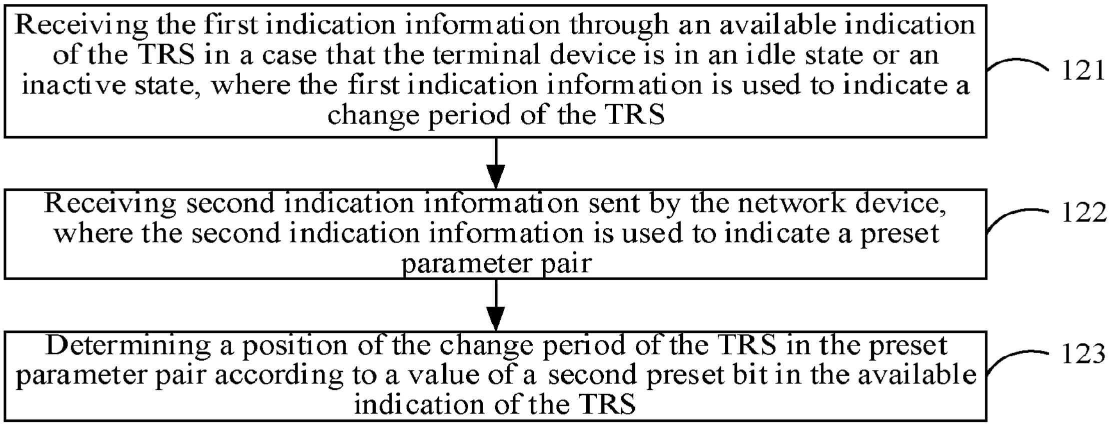
FIG. 12 is a schematic flowchart of a method for determining a tracking reference signal period according to some embodiments of the present disclosure.

Referring to FIG. 12, FIG. 12 is a schematic flowchart of a method for determining a tracking reference signal period according to some embodiments of the present disclosure, and the method is performed by a terminal device. As shown in FIG. 12, the method may include, but is not limited to, the following steps.

In step 121, in a case that the terminal device is in an idle state or an inactive state, first indication information is received through an available indication of the TRS.

Among them, the first indication information is used to indicate a change period of the tracking reference signal (TRS).

In some embodiments, the change period of the TRS indicated by the first indication information included in the available indication of the TRS may be corresponding position information of the change period of the TRS in a preset parameter pair.

Among them, for a specific implementation of step 121, reference may be made to the detailed description in other embodiments of the present disclosure, and details are not described here, again.

In step 122, second indication information sent by a network device is received, where the second indication information is used to indicate a preset parameter pair.

Among them, the preset parameter pair may include two TRS periods of different sizes.

In some embodiments, the preset parameter pair may be configured by higher layer signaling, and include a set of a normally configured TRS period and a power saving TRS period. For example, the preset parameter pair may be [5 ms, 20 ms], where 5 ms may be a normally configured TRS period, and 20 ms may be a power saving TRS period. This is not limited in the present disclosure.

In step 123, a position of the change period of the TRS in the preset parameter pair is determined according to a value of a second preset bit in the available indication of the TRS.

In some embodiments, the terminal device may determine a length n of the second preset bit and the position of the second preset bit in the available indication of the TRS according to a protocol agreement or an indication of the network device, which is not limited in the present disclosure.

For example, if the length of the second preset bit in the available indication of the TRS is 1 bit, and the value is 1, the change period of the TRS may be a period value corresponding to the second position in the preset parameter pair. Alternatively, if the length of the second preset bit is 2 bits and the value is 11, the change period of the TRS may be a period value corresponding to the fourth position in the preset parameter pair.

It should be noted that the foregoing examples are merely schematic descriptions, and should not serve as a specific limitation of the value of the second preset bit in the present disclosure.

By implementing the embodiments of the present disclosure, in a case that the terminal device is in an idle state or an inactive state, the first indication information is received through the available indication of the TRS, then the preset parameter pair sent by the network device is received, and finally, the position of the change period of the TRS in the preset parameter pair is determined according to the value of the second preset bit in the available indication of the TRS, so as to determine the change period of the TRS. Therefore, the process of updating the TRS period does not affect the network signaling, and the impact of updating the TRS period on the power consumption of the network device is reduced.

Figure 13:
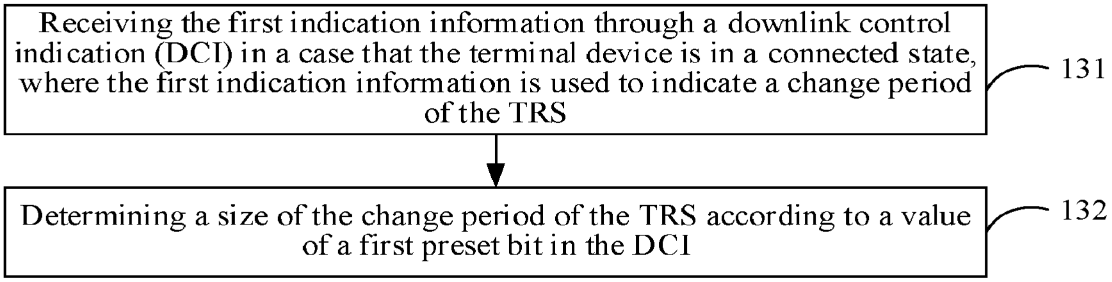
FIG. 13 is a schematic flowchart of a method for determining a tracking reference signal period according to some embodiments of the present disclosure.

Referring to FIG. 13, FIG. 13 is a schematic flowchart of a method for determining a tracking reference signal period according to some embodiments of the present disclosure, and the method is performed by a terminal device. As shown in FIG. 13, the method may include, but is not limited to, the following steps.

In step 131, in a case that the terminal device is in a connected state, first indication information is received through a downlink control indication (DCI).

Among them, the first indication information is used to indicate a change period of the tracking reference signal (TRS).

In some embodiments, the change period of the TRS indicated by the first indication information included in the DCI may be a specific period size after the TRS changes, for example, 10 ms, 20 ms, or the like, which is not limited in the present disclosure.

In step 132, a size of the change period of the TRS is determined according to a value of a first preset bit in the DCI.

Among them, the value of the first preset bit is used to represent a size of the TRS period after change.

For example, if the value of the first preset bit in the DCI is 101, the corresponding size of the change period of the TRS may be 5 ms. Alternatively, the value of the first preset bit in the DCI may be 10010, and the corresponding size of the change period of the TRS may be 10 ms.

It should be noted that the foregoing examples are merely schematic descriptions, and should not serve as a specific limitation of the value of the first preset bit and the size of the change period of the TRS in the present disclosure.

In some embodiments, the terminal device may determine a length n of the first preset bit and a position of the first preset bit in the available indication of the TRS according to a protocol agreement or an indication of the network device, which is not limited in the present disclosure.

By implementing the embodiments of the present disclosure, in a case that the terminal device is in a connected state, the first indication information is received through the DCI, and then the size of the change period of the TRS is determined according to the value of the first preset bit in the DCI. Therefore, the process of updating the TRS period does not affect the network signaling, and the impact of updating the TRS period on the power consumption of the network device is reduced.

Figure 14:
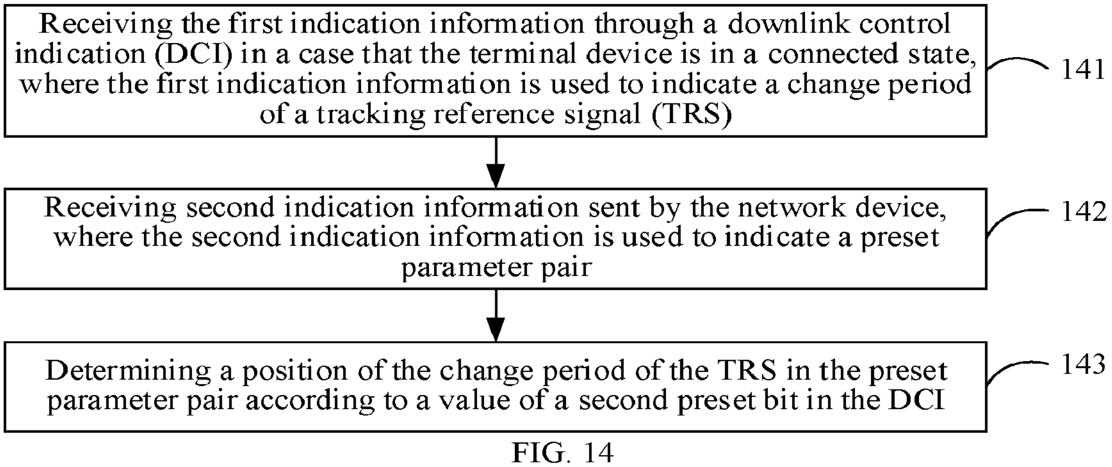
FIG. 14 is a schematic flowchart of a method for determining a tracking reference signal period according to some embodiments of the present disclosure.

Referring to FIG. 14, FIG. 14 is a schematic flowchart of a method for determining a tracking reference signal period according to some embodiments of the present disclosure, and the method is performed by a terminal device. As shown in FIG. 14, the method may include, but is not limited to, the following steps.

In step 141, in a case that the terminal device is in a connected state, first indication information is received through a downlink control indication (DCI).

Among them, the first indication information is used to indicate a change period of the tracking reference signal (TRS).

In some embodiments, the change period of the TRS indicated by the first indication information included in the DCI may be corresponding position information of the change period of the TRS in a preset parameter pair.

Among them, the preset parameter pair may include two TRS periods of different sizes.

In some embodiments, the preset parameter pair may be configured by higher layer signaling, and include a set of a normally configured TRS period and a power saving TRS period. For example, the preset parameter pair may be [5 ms, 20 ms], where 5 ms may be a normally configured TRS period, and 20 ms may be a power saving TRS period. This is not limited in the present disclosure.

In step 142, second indication information sent by a network device is received, where the second indication information is used to indicate a preset parameter pair.

In step 143, a position of the change period of the TRS in the preset parameter pair is determined according to a value of a second preset bit in the DCI.

In some embodiments, the terminal device may determine a length n of the second preset bit and the position of the second preset bit in the DCI according to a protocol agreement or an indication of the network device, which is not limited in the present disclosure.

For example, if the length of the second preset bit in the DCI is 1 bit, and the value is 1, the change period of the TRS may be a period value corresponding to the second position in the preset parameter pair. Alternatively, if the length of the second preset bit is 2 bits and the value is 11, the change period of the TRS may be a period value corresponding to the fourth position in the preset parameter pair.

It should be noted that the foregoing examples are merely schematic descriptions, and should not serve as a specific limitation of the second preset bit in the present disclosure.

By implementing the embodiments of the present disclosure, in a case that the terminal device is in a connected state, the first indication information is received through the DCI, then the preset parameter pair sent by the network device is received, and finally, the position of the change period of the TRS in the preset parameter pair is determined according to the value of the second preset bit in the available indication of the TRS, so as to determine the change period of the TRS. Therefore, the process of updating the TRS period does not affect the network signaling, and the impact of updating the TRS period on the power consumption of the network device is reduced.

In the embodiments provided in the present disclosure, the method provided in the embodiments of the present disclosure is described from the perspective of the network device and the terminal device, respectively. To implement the functions in the method provided in the embodiments of the present disclosure, the network device and the terminal device may include a hardware structure and a software module, so as to implement the foregoing functions in a form of a hardware structure, a software module, or a hardware structure plus a software module. A certain function in the foregoing various functions may be performed in the manner of a hardware structure, a software module, or a hardware structure plus a software module.

Figure 15:
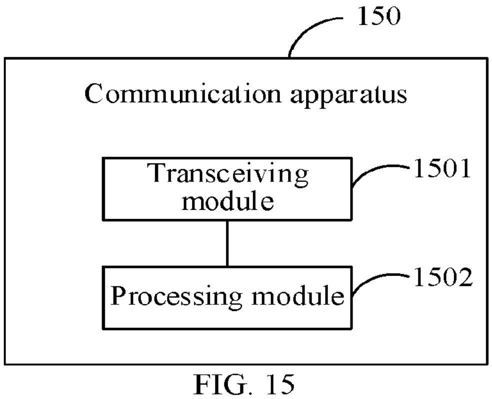
FIG. 15 is a schematic diagram of a structure of a communication apparatus according to some embodiments of the present disclosure.

Referring to FIG. 15, FIG. 15 is a schematic diagram of a structure of a communication apparatus 150 according to some embodiments of the present disclosure. The communication apparatus 150 shown in FIG. 15 may include a processing module 1502 and a transceiving module 1501.

The transceiving module 1501 may include a transmitting module and/or a receiving module, the transmitting module is configured to implement a transmitting function, the receiving module is configured to implement a receiving function, and the transceiving module 1501 may implement a transmitting function and/or a receiving function.

It may be understood that the communication apparatus 150 may be a network device, or may be an apparatus in a network device, or may be an apparatus that can be used in matching with a network device.

A communication apparatus 150 is on a network device side, and the communication apparatus 150 includes a transceiving module 1501. The transceiving module 1501 is configured to send first indication information to a terminal device on a physical layer, where the first indication information is used to indicate a change period of a tracking reference signal (TRS).

In some embodiments, the transceiving module 1501 is configured to send the first indication information to the terminal device through an available indication of the TRS, where the terminal device is in an idle state or an inactive state or send the first indication information to the terminal device through a downlink control indication (DCI), where the terminal device is in a connected state.

In some embodiments, the communication apparatus 150 further includes a processing module 1502.

The processing module 1502 is configured to determine a value of a first preset bit in the available indication of the TRS according to a size of the change period of the TRS; or the processing module 1502 is further configured to determine a value of a first preset bit in the DCI according to a size of the change period of the TRS. Among them, the value of the first preset bit is used to represent a size of a TRS period after change.

In some embodiments, the processing module 1502 is further configured to determine a value of a second preset bit in the available indication of the TRS according to a position of the change period of the TRS in a preset parameter pair or determine a value of a second preset bit in the DCI according to a position of the change period of the TRS in a preset parameter pair;

Among them, the preset parameter pair includes two TRS periods of different sizes.

In some embodiments, the transceiving module 1501 is further configured to send second indication information to the terminal device, where the second indication information is used to indicate the preset parameter pair.

In some embodiments, the transceiving module 1501 is further configured to send the first indication information to the terminal device through the DCI in a case that a service type of the terminal device changes.

According to the communication apparatus provided in the present disclosure, the network device indicates a change period of the tracking reference signal (TRS) on the physical layer to the terminal device. Therefore, the process of updating the TRS period does not affect the network signaling, and the impact of updating the TRS period on the power consumption of the network device is reduced.

It may be understood that the communication apparatus 100 may be a terminal device, or may be an apparatus in the terminal device, or may be an apparatus that can be used in matching with the terminal device.

A communication apparatus 150 is on a terminal device side, and the communication apparatus 150 includes a transceiving module 1501.

The transceiving module 1501 is configured to receive, on a physical layer, first indication information sent by a network device, where the first indication information is used to indicate a change period of the tracking reference signal (TRS).

In some embodiments, the transceiving module 1501 is configured to receive the first indication information through an available indication of the TRS or receive the first indication information through a downlink control indication (DCI).

In some embodiments, the communication apparatus 150 further includes a processing module 1502.

The processing module 1502 is configured to determine a size of a change period of the TRS according to a value of a first preset bit in the available indication of the TRS. The processing module 1502 is further configured to determine a size of a change period of the TRS according to a value of a first preset bit in the DCI. Among them, the value of the first preset bit is used to represent a size of a TRS period after change.

In some embodiments, the processing module 1502 is further configured to determine a position of the change period of the TRS in a preset parameter pair according to a value of a second preset bit in the available indication of the TRS or determine a position of the change period of the TRS in a preset parameter pair according to a value of a second preset bit in the DCI. Among them, the preset parameter pair includes two TRS periods of different sizes.

In some embodiments, the transceiving module 1501 is further configured to receive second indication information sent by a network device, where the second indication information is used to indicate the preset parameter pair.

According to the communication apparatus provided in the present disclosure, the terminal device receives, on a physical layer, first indication information sent by a network device, where the first indication information is used to indicate a change period of the tracking reference signal (TRS). Therefore, the process of updating the TRS period does not affect the network signaling, and the impact of updating the TRS period on the power consumption of the network device is reduced.

Figure 16:
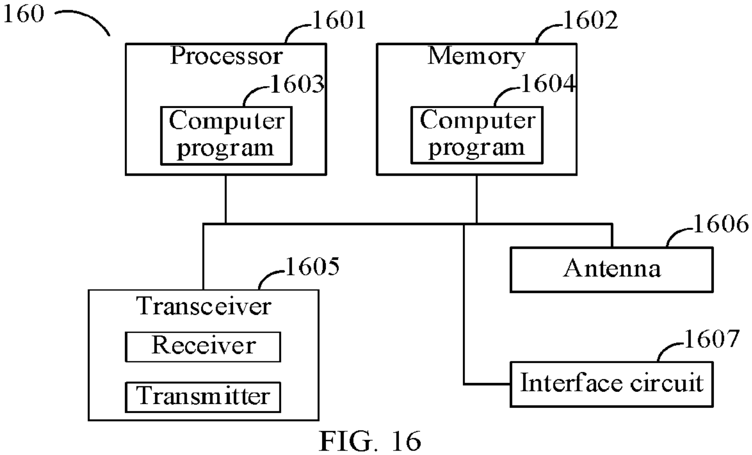
FIG. 16 is a schematic diagram of a structure of a communication apparatus according to some embodiments of the present disclosure.

Referring to FIG. 16, FIG. 16 is a schematic diagram of a structure of another communication apparatus 160 according to some embodiments of the present disclosure. The communication apparatus 160 may be a network device or a terminal device; it may be a chip, a chip system, a processor, or the like that supports the network device to implement the foregoing method; or it may be a chip, a chip system, a processor, or the like that supports the terminal device to implement the foregoing method. The communication apparatus may be configured to implement the method described in the foregoing method embodiments, and reference can be made to the descriptions in the foregoing method embodiments.

The communication apparatus 160 may include one or more processors 1601, and the processor 1601 may be a general-purpose processor, a dedicated processor, or the like. For example, it may be a baseband processor or a central processing unit. The baseband processor may be configured to process a communication protocol and communication data, and the central processing unit may be configured to control the communication apparatus (for example, a base station, a baseband chip, a terminal device, a terminal device chip, a DU, or a CU), execute a computer program, and process data of the computer program.

In some embodiments, the communication apparatus 160 may further include one or more memories 1602, where the memory 1602 may store a computer program 1604, and the processor 1601 executes the computer program 1604, so that the communication apparatus 160 performs the method described in the foregoing method embodiments. In some embodiments, the memory 1602 may further store data. The communication apparatus 160 and the memory 1602 may be separately disposed, or may be integrated together.

In some embodiments, the communication apparatus 160 may further include a transceiver 1605, and an antenna 1606. The transceiver 1605 may be referred to as a transceiving unit, a transceiver, or a transceiving circuit, and is configured to implement a transceiving function. The transceiver 1605 may include a receiver and a transmitter, and the receiver may be referred to as a receiving machine or a receiving circuit, and is configured to implement a receiving function; and the transmitter may be referred to as a transmitting machine or a transmitting circuit, and is configured to implement a transmitting function.

In some embodiments, the communication apparatus 160 may further include one or more interface circuits 1607, where the interface circuit 1607 is configured to receive a code instruction and transmit the code instruction to the processor 1601. The processor 1601 executes the code instruction to enable the communication apparatus 160 to perform the method described in the foregoing method embodiments.

The communication apparatus 160 is a network device, and the processor 1601 is configured to perform step 51 in FIG. 5, step 61 in FIG. 6, step 71 in FIG. 7, step 81 in FIG. 8, or the like. The transceiver 1605 is configured to perform step 21 in FIG. 2, step 31 in FIG. 3, step 41 in FIG. 4, step 52 in FIG. 5, or the like.

The communication apparatus 160 is a terminal device: the processor 1601 is configured to perform step 112 in FIG. 11, step 123 in FIG. 12, or step 132 in FIG. 13, or the like. The transceiver 1605 is configured to perform step 101 in FIG. 10, step 111 in FIG. 11, step 121 and step 122 in FIG. 12, or the like.

In an implementation, the processor 1601 may include a transceiver configured to implement a receiving and transmitting function. For example, the transceiver may be a transceiving circuit, an interface, or an interface circuit. The transceiving circuit, the interface, or the interface circuit configured to implement a receiving and transmitting function may be separate, or may be integrated together. The transceiving circuit, the interface, or the interface circuit may be configured for reading and writing of code/data; or the transceiving circuit, the interface, or the interface circuit may be configured for signal transmission or delivery.

In an implementation, the processor 1601 may store a computer program 1603, and the computer program 1603 runs on the processor 1601, so that the communication apparatus 160 may perform the method described in the foregoing method embodiments. The computer program 1603 may be solidified in the processor 1601; and in this case, the processor 1601 may be implemented by hardware.

In an implementation, the communication apparatus 160 may include a circuit, and the circuit may implement a function of transmitting or receiving or communicating in the foregoing method embodiments. The processor and the transceiver described in the present disclosure may be implemented on an integrated circuit (IC), an analog IC, a radio frequency integrated circuit RFIC, a mixed signal IC, an application specific integrated circuit (ASIC), a printed circuit board (PCB), an electronic device, or the like. The processor and the transceiver may also be fabricated by using various IC process technologies, such as complementary metal oxide semiconductor (CMOS), nMetal-oxide-semiconductor (NMOS), positive channel metal oxide semiconductor (PMOS), bipolar junction transistor (BJT), bipolar CMOS (BiCMOS) silicon germanium (SiGe), gallium arsenide (GaAs), etc.

The communication apparatus in the foregoing embodiment description may be a network device or a terminal device, but the scope of the communication apparatus described in the present disclosure is not limited to this, and the structure of the communication apparatus may not be limited by FIG. 16. The communication apparatus may be an independent device or may be a part of a larger device. For example, the communication apparatus may be:

(1) an independent integrated circuit IC, or chip, or chip system or subsystem;

(2) a set with one or more ICs, where, in some embodiments, the IC set may also include a storage component for storing data and a computer program;

(3) an ASIC, such as a modem;

(4) a module that may be embedded in other devices;

(5) a receiver, a terminal device, an intelligent terminal device, a cellular phone, a wireless device, a handset, a mobile unit, a vehicle-mounted device, a network device, a cloud device, an artificial intelligence device, or the like;

(6) other apparatuses, and so on.

Figure 17:
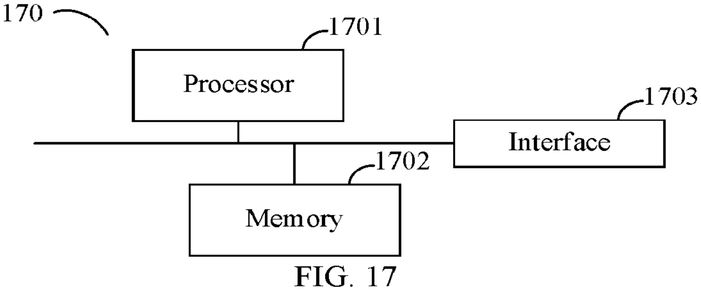
FIG. 17 is a schematic diagram of a structure of a chip according to some embodiments of the present disclosure.

For a case in which the communication apparatus may be a chip or a chip system, reference can be made to the schematic diagram of a structure of the chip shown in FIG. 17. The chip shown in FIG. 17 includes a processor 1701 and an interface 1703, where there may be one or more processors 1701, and there may be a plurality of interfaces 1702.

For a case in which the chip is configured to implement functions of a network device in the embodiments of the present disclosure the processor 1701 is configured to perform step 51 in FIG. 5, step 61 in FIG. 6, step 71 in FIG. 7, step 81 in FIG. 8, or the like. The interface 1703 is configured to perform step 21 in FIG. 2, step 31 in FIG. 3, step 41 in FIG. 4, step 52 in FIG. 5, or the like.

For a case in which the chip is configured to implement functions of a terminal device in the embodiments of the present disclosure the processor 1701 is configured to perform step 112 in FIG. 11, step 123 in FIG. 12, step 132 in FIG. 13, or the like. The interface 1703 is configured to perform step 101 in FIG. 10, step 111 in FIG. 11, step 121 and step 122 in FIG. 12, or the like.

In some embodiments, the chip further includes a memory 1702, and the memory 1702 is configured to store a necessary computer program and data.

Those skilled in the art may further understand that various illustrative logical blocks and steps listed in the embodiments of the present disclosure may be implemented by electronic hardware, computer software, or a combination of the two. Whether such function is implemented by hardware or software depends upon the particular application and design requirements of the overall system. Those skilled in the art may use various methods to implement the functions for each particular application, but it should not be understood that such implementation goes beyond the protection scope of the embodiments of the present disclosure.

According to some embodiments of the present disclosure, there is further provided a communications system. The system includes a communication apparatus serving as a terminal device and a communication apparatus serving as a network device in the foregoing embodiment in FIG. 15; or the system includes a communication apparatus serving as a terminal device and a communication apparatus serving as a network device in the foregoing embodiment in FIG. 16.

According to the present disclosure, there is further provided a computer-readable storage medium with an instruction stored thereon. When the instruction is executed by a computer, the functions of any one of the foregoing method embodiments are implemented.

According to the present disclosure, there is further provided a computer program product. When the computer program product is executed by a computer, the functions of any one of the foregoing method embodiments are implemented.

According to embodiments of the present disclosure, there is provided a method and apparatus for determining a tracking reference signal period, which may be applied in the field of communication technology.

In a first aspect, according to some embodiments of the present disclosure, there is provided a method for determining a tracking reference signal period, where the method is performed by a network device, and the method includes sending, on a physical layer, first indication information to a terminal device, where the first indication information is used to indicate a change period of a tracking reference signal (TRS).

In some embodiments, sending the first indication information to the terminal device includes sending the first indication information to the terminal device through an available indication of the TRS, where the terminal device is in an idle state or an inactive state or sending the first indication information to the terminal device through a downlink control indication (DCI), where the terminal device is in a connected state.

In some embodiments, the method further includes determining a value of a first preset bit in the available indication of the TRS according to a size of the change period of the TRS or determining a value of a first preset bit in the DCI according to a size of the change period of the TRS, where the value of the first preset bit is used to represent a size of a TRS period after change.

In some embodiments, the method further includes determining a value of a second preset bit in the available indication of the TRS according to a position of the change period of the TRS in a preset parameter pair or determining a value of a second preset bit in the DCI according to a position of the change period of the TRS in a preset parameter pair, where the preset parameter pair includes two TRS periods of different sizes.

In some embodiments, the method further includes sending second indication information to the terminal device, where the second indication information is used to indicate the preset parameter pair.

In some embodiments, sending the first indication information to the terminal device through the downlink control indication (DCI) includes sending the first indication information to the terminal device through the DCI in a case that a service type of the terminal device changes.

In a second aspect, according to some embodiments of the present disclosure, there is provided another method for determining a tracking reference signal period, where the method is performed by a terminal device, and the method includes receiving, on a physical layer, first indication information sent by a network device, where the first indication information is used to indicate a change period of a tracking reference signal (TRS).

In some embodiments, receiving the first indication information sent by the network device includes receiving the first indication information through an available indication of the TRS or receiving the first indication information through a downlink control indication (DCI).

In some embodiments, the method further includes determining a size of the change period of the TRS according to a value of a first preset bit in the available indication of the TRS or determining a size of the change period of the TRS according to a value of a first preset bit in the DCI, where the value of the first preset bit is used to represent a size of a TRS period after change.

In some embodiments, the method further includes determining a position of the change period of the TRS in a preset parameter pair according to a value of a second preset bit in the available indication of the TRS or determining a position of the change period of the TRS in a preset parameter pair according to a value of a second preset bit in the DCI, where the preset parameter pair includes two TRS periods of different sizes.

In some embodiments, the method further includes receiving second indication information sent by the network device, where the second indication information is used to indicate the preset parameter pair.

In a third aspect, according to some embodiments of the present disclosure, there is provided a communication apparatus, where the communication apparatus has functions of implementing some or all functions of the network device in the method according to the first aspect. For example, the functions of the communication apparatus may include functions in some or all of the embodiments of the present disclosure, or may include functions for separately implementing any embodiment of the present disclosure. The function may be implemented by hardware, or may be implemented by hardware executing corresponding software. The hardware or the software includes one or more units or modules corresponding to the foregoing functions.

In a fourth aspect, according to some embodiments of the present disclosure, there is provided another communication apparatus, where the communication apparatus has functions of implementing some or all functions of the network device in the method according to the second aspect. For example, the functions of the communication apparatus may include functions in some or all of the embodiments of the present disclosure, or may include functions for separately implementing any embodiment of the present disclosure. The function may be implemented by hardware, or may be implemented by hardware executing corresponding software. The hardware or the software includes one or more units or modules corresponding to the foregoing functions.

In a fifth aspect, according to some embodiments of the present disclosure, there is provided a communication apparatus, where the communication apparatus includes a processor, and when the processor invokes a computer program in a memory, the method according to the first aspect is performed.

In a sixth aspect, according to some embodiments of the present disclosure, there is provided a communication apparatus, where the communication apparatus includes a processor, and when the processor invokes a computer program in a memory, the method according to the second aspect is performed.

In a seventh aspect, according to some embodiments of the present disclosure, there is provided a communication apparatus, where the communication apparatus includes a processor and a memory, and the memory stores a computer program; and when the computer program is executed by the processor, the communication apparatus is enabled to perform the method according to the first aspect.

In an eighth aspect, according to some embodiments of the present disclosure, there is provided a communication apparatus, where the communication apparatus includes a processor and a memory, and the memory stores a computer program; and when the computer program is executed by the processor, the communication apparatus is enabled to perform the method according to the second aspect.

In a ninth aspect, according to some embodiments of the present disclosure, there is provided a communication apparatus, where the communication apparatus includes a processor and an interface circuit, the interface circuit is configured to receive a code instruction and transmit the code instruction to the processor, and the processor is configured to run the code instruction to enable the apparatus to perform the method according to the first aspect.

In a tenth aspect, according to some embodiments of the present disclosure, there is provided a communication apparatus, where the communication apparatus includes a processor and an interface circuit, the interface circuit is configured to receive a code instruction and transmit the code instruction to the processor, and the processor is configured to run the code instruction to enable the communication apparatus to perform the method according to the second aspect.

In an eleventh aspect, according to some embodiments of the present disclosure, there is provided a communication system, where the communication system includes the communication apparatus according to the third aspect and the communication apparatus according to the fourth aspect, or the system includes the communication apparatus according to the fifth aspect and the communication apparatus according to the sixth aspect, or the system includes the communication apparatus according to the seventh aspect and the communication apparatus according to the eighth aspect, or the system includes the communication apparatus according to the ninth aspect and the communication apparatus according to the tenth aspect.

In a twelfth aspect, according to some embodiments of the present disclosure, there is provided a computer-readable storage medium configured to store an instruction used by the network device; and when the instruction is executed, the method according to the first aspect is enabled to be implemented.

In a thirteenth aspect, according to some embodiments of the present disclosure, there is provided a computer-readable storage medium configured to store an instruction used by the terminal device; and when the instruction is executed, the method according to the second aspect is enabled to be implemented.

In a fourteenth aspect, according to the present disclosure, there is provided a computer program product including a computer program, and when the computer program product runs on a computer, the computer is enabled to perform the method according to the first aspect.

In a fifteenth aspect, according to the present disclosure, there is provided a computer program product including a computer program, and when the computer program product runs on a computer, the computer is enabled to perform the method according to the second aspect.

In a sixteenth aspect, according to the present disclosure, there is provided a chip system, where the chip system includes at least one processor and an interface, and is configured to support a network device in implementing functions involved in the first aspect, for example, determining or processing at least one of data or information involved in the foregoing method. In a possible design, the chip system further includes a memory, and the memory is configured to store computer programs and data that are necessary for the network device. The chip system may include a chip, or may include a chip and another discrete component.

In a seventeenth aspect, according to the present disclosure, there is provided a chip system, where the chip system includes at least one processor and an interface, and is configured to support the terminal device in implementing functions involved in the second aspect, for example, determining or processing at least one of data and information involved in the foregoing method. In a possible design, the chip system further includes a memory, and the memory is configured to store computer programs and data that are necessary for the terminal device. The chip system may include a chip, or may include a chip and another discrete component.

In an eighteenth aspect, according to the present disclosure, there is provided a computer program, and when the computer program runs on a computer, the computer is enabled to perform the method according to the first aspect.

In a nineteenth aspect, according to the present disclosure, there is provided a computer program, and when the computer program runs on a computer, the computer is enabled to perform the method according to the second aspect.

All or some of the foregoing embodiments may be implemented by using software, hardware, firmware, or any combination of them. When implemented by using software, all or some of the embodiments may be implemented in a form of a computer program product. The computer program product includes one or more computer programs. When the computer program is loaded and executed on a computer, the processes or functions according to the embodiments of the present disclosure are all or partially generated. The computer may be a general-purpose computer, a dedicated computer, a computer network, or another programmable apparatus. The computer program may be stored in a non-transitory computer-readable storage medium, or transmitted from one non-transitory computer-readable storage medium to another non-transitory computer-readable storage medium; for example, the computer program may be transmitted from a website, computer, server, or data center to another website, computer, server, or data center in a wired manner (for example, a coaxial cable, an optical fiber, a digital subscriber line (DSL)), or a wireless manner (for example, infrared, radio, or microwave). The non-transitory computer-readable storage medium may be any available medium accessible by a computer, or a data storage device (such as a server or a data center) integrating one or more available medium. The available medium may be a magnetic medium (for example, a floppy disk, a hard disk, or a magnetic tape), an optical medium (for example, a high-density digital video disk (DVD)), a semiconductor medium (for example, a solid state disk (SSD)), or the like.

Those of ordinary skill in the art may understand that various numerical numbers such as first and second involved in the present disclosure are only for the convenience of distinguishing the description, and are not intended to limit the scope of the embodiments of the present disclosure, and also indicate a sequence.

"At least one" in the present disclosure may also be described as one or more, and "more than one" may be two, three, four, or more, which is not limited in the present disclosure. In the embodiments of the present disclosure, for a kind of technical features, technical features in such kind of technical features are distinguished by "first", "second", "third", "A", "B", "C", and "D", etc. There is no sequential order or size order among the technical features described in "first", "second", "third", "A", "B", "C" and "D".

The correspondence shown in the various tables in the present disclosure may be configured, or may be predefined. The value of the information in each table is merely an example, and may be configured as other values, which is not limited in the present disclosure. When the correspondences between the information and various parameters are configured, it is not necessary to configure all the correspondences shown in the tables. For example, in the tables in the present disclosure, the correspondence shown in some rows may also not be configured. For another example, appropriate deformation adjustment may be performed based on the foregoing table, for example, splitting, merging, or the like. Names of parameters indicated by the titles shown in the various tables may also be other names that may be understood by the communication apparatus, and values or representations of the parameters may also be other values or representations that may be understood by the communication apparatus. When the foregoing tables are implemented, other data structures may be used, for example, an array, a queue, a container, a stack, a linear table, a pointer, a linked list, a tree, a graph, a structure, a class, a heap, or a hash table may be used.

The predefinition in the present disclosure may be understood as definition, definition in advance, storage, pre-storage, pre-negotiation, pre-configuration, solidification, or pre-firing.

Those of ordinary skill in the art may be aware that, the various example units and algorithm steps described in combination with the embodiments disclosed in the context, may be implemented by electronic hardware or a combination of computer software and electronic hardware. Whether the functions are performed by hardware or software depends on particular applications and design constraint conditions of the technical solutions. Those skilled in the art may use different methods to implement the described functions for each particular application, but it should not be considered that the implementation goes beyond the scope of the present disclosure.

Those skilled in the art may clearly understand that, for the purpose of convenient and brief description, for a detailed working process of the foregoing system, apparatus, and unit, reference can be made to a corresponding process in the foregoing method embodiments, and details are not described here again.

The above are only specific embodiments of the present disclosure, and the protection scope of the present disclosure is not limited to this. Variants and substitutions that any person skilled in the art can easily conceived of within the technical scope disclosed by the present disclosure, should be covered within the protection scope of the present disclosure. Therefore, the protection scope of the present disclosure shall be subject to the protection scope of the claims.

What is claimed is:

1. A method for determining a tracking reference signal period, performed by a network device, and comprising:

sending, on a physical layer, first indication information to a terminal device, wherein the first indication information is used to indicate a change period of a tracking reference signal (TRS);

wherein sending the first indication information to the terminal device comprises at least one of:

sending the first indication information to the terminal device through an available indication of the TRS, wherein the terminal device is in an idle state or an inactive state; or sending the first indication information to the terminal device through a downlink control indication (DCI), wherein the terminal device is in a connected state;

and wherein the method further comprises at least one of:

determining a value of a first preset bit in the available indication of the TRS according to a size of the change period of the TRS, wherein the value of the first preset bit is used to represent a size of a TRS period after change; or determining a value of a first preset bit in the DCI according to a size of the change period of the TRS, wherein the value of the first preset bit is used to represent a size of a TRS period after change.

2. The method according to claim 1, further comprising at least one of:

determining a value of a second preset bit in the available indication of the TRS according to a position of the change period of the TRS in a preset parameter pair, wherein the preset parameter pair comprises two TRS periods of different sizes; or determining a value of a second preset bit in the DCI according to a position of the change period of the TRS in a preset parameter pair, wherein the preset parameter pair comprises two TRS periods of different sizes.

3. The method according to claim 2, further comprising:

sending second indication information to the terminal device, wherein the second indication information is used to indicate the preset parameter pair.

4. The method according to claim 1, wherein sending the first indication information to the terminal device through the downlink control indication (DCI) comprises:

sending the first indication information to the terminal device through the DCI in a case that a service type of the terminal device changes.

5. A method for determining a tracking reference signal period, performed by a terminal device, and comprising:

receiving, on a physical layer, first indication information sent by a network device, wherein the first indication information is used to indicate a change period of a tracking reference signal (TRS);

wherein receiving the first indication information sent by the network device comprises at least one of:

receiving the first indication information through an available indication of the TRS; or receiving the first indication information through a downlink control indication (DCI);

and wherein the method further comprises at least one of:

determining a size of the change period of the TRS according to a value of a first preset bit in the available indication of the TRS, wherein the value of the first preset bit is used to represent a size of a TRS period after change; or determining a size of the change period of the TRS according to a value of a first preset bit in the DCI, wherein the value of the first preset bit is used to represent a size of a TRS period after change.

6. The method according to claim 5, further comprising at least one of:

determining a position of the change period of the TRS in a preset parameter pair according to a value of a second preset bit in the available indication of the TRS, wherein the preset parameter pair comprises two TRS periods of different sizes; or determining a position of the change period of the TRS in a preset parameter pair according to a value of a second preset bit in the DCI, wherein the preset parameter pair comprises two TRS periods of different sizes.

7. The method according to claim 6, further comprising:

receiving second indication information sent by the network device, wherein the second indication information is used to indicate the preset parameter pair.

8. A communication apparatus, comprising a processor and a memory, wherein the memory stores a computer program, and the processor executes the computer program stored in the memory to enable the communication apparatus to perform a method comprising:

sending, on a physical layer, first indication information to a terminal device, wherein the first indication information is used to indicate a change period of a tracking reference signal (TRS);

wherein sending the first indication information to the terminal device comprises at least one of:

sending the first indication information to the terminal device through an available indication of the TRS, wherein the terminal device is in an idle state or an inactive state; or sending the first indication information to the terminal device through a downlink control indication (DCD), wherein the terminal device is in a connected state;

and wherein the method further comprises at least one of:

determining a value of a first preset bit in the available indication of the TRS according to a size of the change period of the TRS, wherein the value of the first preset bit is used to represent a size of a TRS period after change; or determining a value of a first preset bit in the DCI according to a size of the change period of the TRS, wherein the value of the first preset bit is used to represent a size of a TRS period after change.

9. A communication apparatus, comprising a processor and a memory, wherein the memory stores a computer program, and the processor executes the computer program stored in the memory to enable the communication apparatus to perform the method according to claim 5.

10. A communication apparatus, comprising a processor and an interface circuit;

wherein the interface circuit is configured to receive a code instruction and transmit the code instruction to the processor; and the processor is configured to run the code instruction to perform the method according to claim 1.

11. A communication apparatus, comprising a processor and an interface circuit;

wherein the interface circuit is configured to receive a code instruction and transmit the code instruction to the processor; and the processor is configured to run the code instruction to perform the method according to claim 5.

12. A non-transitory computer-readable storage medium, configured for storing an instruction, wherein when the instruction is executed, the method according to claim 1 is enabled to be implemented.

13. A non-transitory computer-readable storage medium, configured for storing an instruction, wherein when the instruction is executed, the method according to claim 5 is enabled to be implemented.

14. The method according to claim 2, wherein sending the first indication information to the terminal device through the downlink control indication (DCI) comprises:

sending the first indication information to the terminal device through the DCI in a case that a service type of the terminal device changes.

15. The method according to claim 3, wherein sending the first indication information to the terminal device through the downlink control indication (DCI) comprises:

sending the first indication information to the terminal device through the DCI in a case that a service type of the terminal device changes.

* * * * *